US009585405B2

(12) United States Patent
Hughes, Jr.

(10) Patent No.: US 9,585,405 B2
(45) Date of Patent: Mar. 7, 2017

(54) PORTABLE DEVICE AND METHOD FOR IMPROVED MEAT TENDERIZATION

(71) Applicant: Tenderbuck LLC, Houston, TX (US)

(72) Inventor: Robert S. Hughes, Jr., Houston, TX (US)

(73) Assignee: Tenderbuck, LLC, Houston, TX (US)

( * ) Notice: Subject to any disclaimer, the term of this patent is extended or adjusted under 35 U.S.C. 154(b) by 358 days.

(21) Appl. No.: 13/946,058

(22) Filed: Jul. 19, 2013

(65) Prior Publication Data
US 2015/0024666 A1 Jan. 22, 2015

(51) Int. Cl.
A22B 5/00 (2006.01)

(52) U.S. Cl.
CPC .................. *A22B 5/0088* (2013.01)

(58) Field of Classification Search
CPC ................ A22B 3/00; A22B 3/06; A22B 5/00
USPC .................. 452/141, 197; 320/105, 135, 136
See application file for complete search history.

(56) References Cited

U.S. PATENT DOCUMENTS

| 2,544,681 | A | | 3/1951 | Harsham et al. | |
|---|---|---|---|---|---|
| 3,152,357 | A | * | 10/1964 | Wemmer | A22B 3/06 452/60 |
| 3,167,809 | A | * | 2/1965 | Rollins | A22B 3/06 452/53 |
| 3,654,538 | A | * | 4/1972 | Gardberg | H02J 7/0034 320/105 |
| 3,659,183 | A | * | 4/1972 | Carlson | H02H 11/002 307/127 |
| 3,711,896 | A | * | 1/1973 | Guberman | A22C 9/00 426/238 |
| 3,746,897 | A | * | 7/1973 | Karatjas | B06B 1/0238 310/316.01 |
| 3,963,976 | A | * | 6/1976 | Clark | H02J 7/008 320/138 |
| 4,215,306 | A | * | 7/1980 | Mace | F02P 17/00 320/105 |
| 4,221,021 | A | * | 9/1980 | Swilley | A22C 9/002 452/141 |
| 4,340,993 | A | | 7/1982 | Cook | |
| 4,495,676 | A | * | 1/1985 | Hartmetz, II | A22C 9/002 452/141 |
| 4,561,149 | A | | 12/1985 | Nijhuis | |
| 4,727,306 | A | * | 2/1988 | Misak | G01R 19/16542 320/152 |
| 4,769,586 | A | * | 9/1988 | Kazmierowicz | H02J 7/0034 307/10.1 |

(Continued)

*Primary Examiner* — Richard Price, Jr.
(74) *Attorney, Agent, or Firm* — Fletcher Yoder, P.C.

(57) ABSTRACT

Systems, computer instructions stored in non-transitory machine readable mediums, and methods are disclosed herein. A portable system for electrically stimulating meat is provided. The system includes a portable housing configured to house a battery power supply. The system further includes a first end connector configured to attach to a target of tenderization, and a second end connector configured to attach to the target of tenderization. The system additionally includes a circuitry electrically coupling the battery power supply to the first and the second end connectors, the circuitry disposed in the portable housing, wherein the circuitry comprises a microprocessor programmed to derive a first electrical condition and to electrically stimulate the target through the first and the second end connectors only when the first electrical condition is not met.

10 Claims, 9 Drawing Sheets

(56) References Cited

U.S. PATENT DOCUMENTS

| | | | | |
|---|---|---|---|---|
| 4,875,253 A * | 10/1989 | Lambooy | A22B 3/06 | 452/141 |
| 4,953,263 A * | 9/1990 | Lambooy | A22B 3/06 | 452/58 |
| 5,083,076 A * | 1/1992 | Scott | H01M 10/46 | 320/105 |
| 5,236,323 A * | 8/1993 | Long | A22C 17/12 | 452/127 |
| 5,486,145 A * | 1/1996 | Dorsthorst | A22B 3/06 | 452/58 |
| 5,512,014 A * | 4/1996 | Burnett | A22B 3/06 | 452/141 |
| 5,635,817 A * | 6/1997 | Shiska | H02G 11/02 | 320/105 |
| 5,643,072 A * | 7/1997 | Lankhaar | A22B 3/00 | 452/66 |
| 5,704,830 A * | 1/1998 | Van Ochten | A22B 3/06 | 452/58 |
| 5,888,132 A * | 3/1999 | Burnett | A22B 3/06 | 452/141 |
| 5,936,381 A * | 8/1999 | Suh | H02J 7/0047 | 320/104 |
| 5,954,572 A * | 9/1999 | Kettlewell | A22B 3/06 | 452/58 |
| 5,954,573 A * | 9/1999 | Ohgaki | A22B 3/086 | 452/58 |
| 5,993,250 A * | 11/1999 | Hayman | H02J 7/0034 | 320/105 |
| 6,002,235 A * | 12/1999 | Clore | H01R 11/24 | 320/105 |
| 6,130,519 A * | 10/2000 | Whiting | H02J 7/0034 | 320/105 |
| 6,167,759 B1 * | 1/2001 | Bond | A22B 5/007 | 600/437 |
| 6,212,054 B1 * | 4/2001 | Chan | H02J 7/0034 | 307/10.7 |
| 6,290,592 B1 * | 9/2001 | Allen | A22B 3/06 | 452/141 |
| 6,300,742 B1 * | 10/2001 | Hung | H02J 7/0034 | 320/103 |
| 6,471,576 B1 * | 10/2002 | Ross | A22B 3/06 | 452/58 |
| 6,650,086 B1 * | 11/2003 | Chang | H01M 2/342 | 320/105 |
| 6,803,743 B2 * | 10/2004 | George | H02J 7/0034 | 320/105 |
| 6,822,425 B2 * | 11/2004 | Krieger | H02J 7/0054 | 320/137 |
| 6,988,053 B2 * | 1/2006 | Namaky | G01R 31/007 | 320/104 |
| 7,025,669 B2 * | 4/2006 | Richards | A22B 5/0088 | 452/141 |
| 7,241,212 B2 * | 7/2007 | Horst | A22B 3/086 | 452/58 |
| 7,244,172 B2 * | 7/2007 | Horst | A22B 3/06 | 452/58 |
| 7,423,853 B2 * | 9/2008 | Gupta | H01F 5/02 | 361/38 |
| 7,528,579 B2 * | 5/2009 | Pacholok | H02J 7/022 | 320/130 |
| 7,674,161 B2 * | 3/2010 | Knochenmus | A22C 9/002 | 452/141 |
| 7,686,679 B2 * | 3/2010 | Higuchi | A22B 5/0088 | 452/141 |
| 7,808,211 B2 * | 10/2010 | Pacholok | H02J 7/022 | 320/140 |
| 7,834,596 B2 * | 11/2010 | Hsieh | H03M 1/002 | 320/166 |
| 7,841,928 B2 * | 11/2010 | Tseng | A22B 3/06 | 452/58 |
| 8,085,517 B2 * | 12/2011 | Weems, II | G01R 31/025 | 324/528 |
| 8,237,412 B2 * | 8/2012 | Johnson | H02J 7/0093 | 320/138 |
| 8,376,815 B1 * | 2/2013 | Parker | A22C 9/002 | 452/141 |
| 8,500,726 B2 * | 8/2013 | Hancock | A61B 18/1815 | 606/32 |
| 9,113,808 B2 * | 8/2015 | Bohorquez | A61B 5/053 | |
| 2001/0031617 A1 | 10/2001 | Allen et al. | | |
| 2004/0097180 A1 * | 5/2004 | Long | A22C 9/00 | 452/141 |
| 2005/0014460 A1 * | 1/2005 | van Esbroeck | A22B 5/0088 | 452/141 |
| 2007/0254579 A1 | 11/2007 | Gardner et al. | | |
| 2007/0287370 A1 * | 12/2007 | Mirtsching | A22C 9/002 | 452/141 |
| 2011/0012561 A1 * | 1/2011 | Whiting | H01M 10/44 | 320/149 |
| 2013/0017771 A1 * | 1/2013 | Birgisson | A22B 3/083 | 452/106 |

\* cited by examiner

PORTABLE DEVICE AND METHOD FOR IMPROVED MEAT TENDERIZATION

BACKGROUND OF THE INVENTION

The subject matter disclosed herein relates to systems and methods relating to meat tendering, and more specifically, to portable meat tenderization and flavor improvement.

A variety of systems, including mechanical, chemical systems, and electrical may be used to process an animal carcass to result in tenderized meat. For example, mechanical processing, such as pounding or piercing may be applied to meat to mechanically break down tissue. Chemicals, such as marinating compositions, may also be applied, for example, to break down the collagens in meat. Electrical stimulation of meat may additionally be used. In electrical stimulation, an electric current may be applied to the carcass and used to tenderize the meat. It would be beneficial to provide for improved devices and methods of electrical stimulation for the tenderization of meat.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a portable system for electrically stimulating meat is provided. The system includes a portable housing configured to house a battery power supply. The system further includes a first end connector configured to attach to a target of tenderization, and a second end connector configured to attach to the target of tenderization. The system additionally includes a circuitry electrically coupling the battery power supply to the first and the second end connectors, the circuitry disposed in the portable housing, wherein the circuitry comprises a microprocessor programmed to derive a first electrical condition and to electrically stimulate the target through the first and the second end connectors only when the first electrical condition is not met.

In a second embodiment, non-transitory machine readable medium comprising instructions executable by portable electrical stimulator system are provided. The instructions are configured to charge at least one capacitor to a voltage between 10 and 30 volts, and to electrically couple the at least one capacitor to a first lead and to a second lead. The instructions are further configured to discharge a current incoming from the capacitor through the first and the second leads and to determine if the discharge took less than a first time, and if the discharge took less than the first time, to provide indications that a resistance is undesirably low.

In a third embodiment, a portable system for electrically stimulating meat is provided. The system includes a power supply circuit configured to provide power and a microprocessor circuit coupled to the power supply circuit and programmed to derive a first electrical condition and to electrically stimulate a target only when the first electrical condition is not met. The system further includes an inverter circuit coupled to the microprocessor circuit and configured to charge at least one capacitor to a DC voltage of 20 volts or more, and a stimulator circuit coupled to the microprocessor circuit and configured to deliver a first plurality of electrical pulses having a first polarity to electrically stimulate the target.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
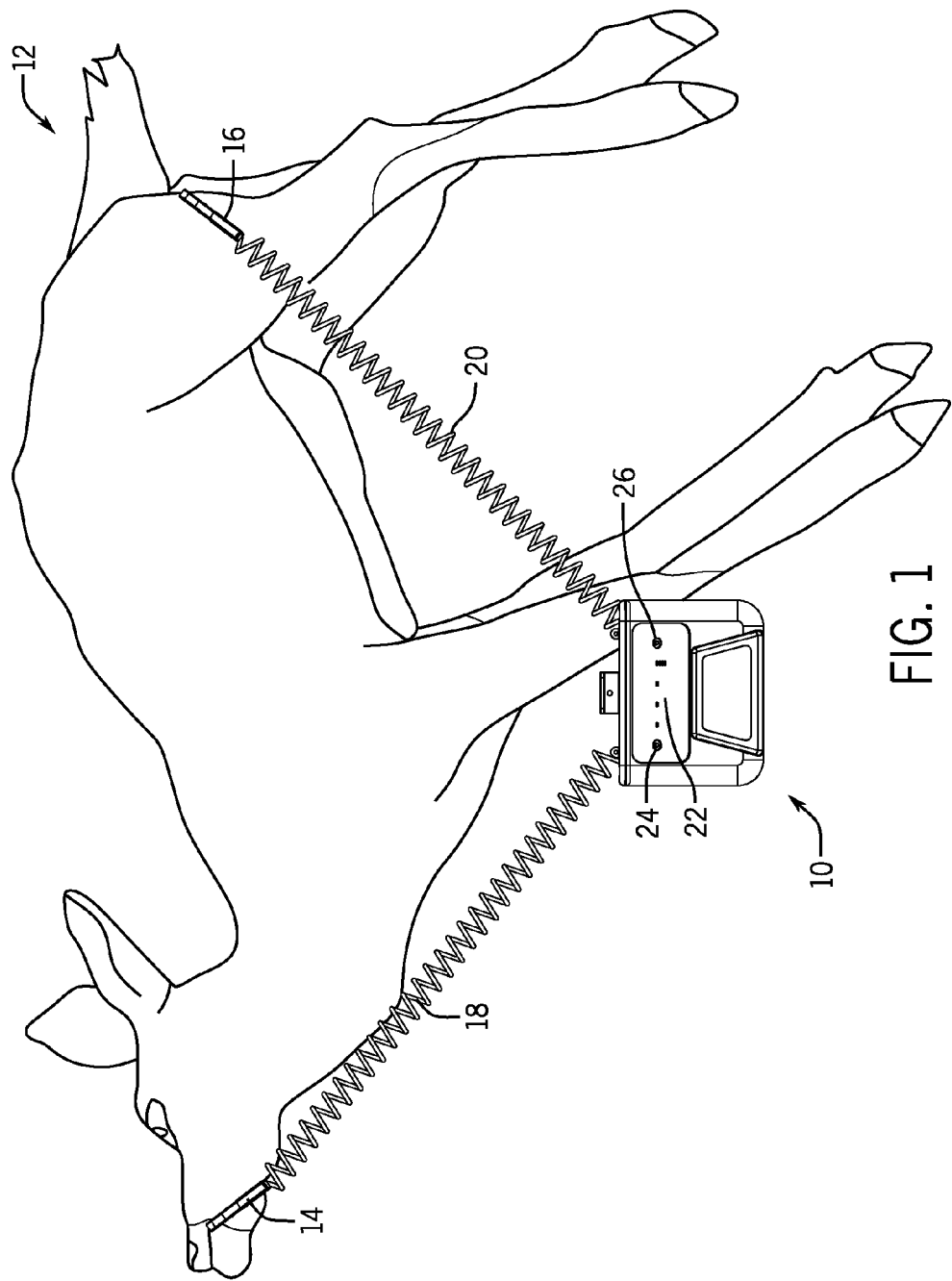
FIG. 1 is a view of an embodiment of a portable electrical stimulation system operatively coupled to a game animal carcass.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for more efficiently tenderizing meat and improving flavor, such as a game carcass harvested during hunting activities. More specifically, the disclosed embodiments include a portable electrostimulation system suitable for field use. Because of its compactness and weight, a user may more easily transport the portable electrostimulation system into the field to provide for electrical stimulation of harvested game, such as by delivering a train of electrical pulses. The electrical pulses may cause contraction and subsequent relaxation of tissue, resulting in improved tenderization, blood removal, and enhanced taste of the meat.

Advantageously, the portable electrostimulation system may include several enhanced features, such as automatic detection of certain operations conditions (e.g., shorts, high resistance) describe in more detail below, and clamps with blunt ends suitable for delivering electrical power while minimizing or eliminating the inadvertent puncturing of the game animal or of the user. The techniques described herein may provide electrical stimulation in a train of pulses, such as a pulse train having between 5-50 pulses, or more pulses. After a certain number of pulse trains, the electrical polarity may be switched, and one or more pulse train may then be provided. Switching the polarity may overcome tissue resistance built during the previous one or more pulse trains, and may increase meat tenderization, tissue contractions, and subsequent blood removal. Visual and/or audio indications, such as lights, LED panels, audio sounds/voices, may also be provided, suitable for more quickly indicating an operating status of the portable electrostimulation system, as well as a plurality of operations conditions (e.g., shorts, high resistance).

Turning now to FIG. 1, the figure is a view of depicting an embodiment of a portable electrostimulation system 10 operatively coupled to a harvested game animal or carcass 12. The electrostimulation system 10 may be, for example, a Tenderbuck™ electrostimulation system available from Tenderbuck, LLC, of Houston, Tex. In use, the portable electrostimulation system 10 may deliver electrical stimulation to the game animal 12 through the clamps 14 and 16, for example, by causing an electrical current flow between the clamps 14 and 16 suitable for contracting tissue. A power supply may deliver electrical current through electrically conductive, coiled or straight conduits 18 and 20 connected to the clamps 14 and 16 respectively. The electrical power may be applied as pulse trains, causing the relaxation and contraction of the carcass' 12 tissue, thus improving the removal of blood from the carcass 12, and breaking down tissue. For example, electrical stimulation of the tissue may lower the pH in muscle through anaerobic glycolysis, additionally shortening the time to reach rigor mortis, resulting in the stretching of sarcomeres in the tissue. Contractions may also disrupt myofibrils in the tissue, for example, by rupturing lysosomes and releasing cathepsins. Accordingly, the carcass 12 may become more tenderized, and the flavor improved. Further, as the tissues in the carcass 12 contract and relax, blood in the tissue may traverse through the vascular system to be expelled through an opening therein, thus additionally improving the taste.

The techniques described herein enable a user, such as a hunter, to carry the portable electrostimulating system 10 into the field to process the game animal carcass 12 in situ. Indeed, the game animal carcass 12 may be processed quickly upon harvesting by making small incisions through the animal's 12 hide and applying the clamps 14 and 16 directly to the tissue through the incisions. Additionally or alternatively, the clamps 14 and/or 16 may be applied to the tongue or other exposed tissue. One clamp 14 or 16 may be attached to a head end (e.g., near the mouth) of the animal carcass 12 and another clamp may be attached to a posterior end (e.g., near the tail) of the animal carcass. Accordingly, electrical current may traverse through a substantial portion of the animal 12 tissue and/or central nervous system, causing contractions and relaxations of the tissue therein.

Advantageously, the portable electrostimulating system 10 may include a variety of features enhancing electrostimulation activities. For example, the clamps 14 and 16, as described in more detail below, may include blunt ends suitable for preventing or eliminating inadvertent injury, such as punctures. The portable electrostimulating system 10 may additionally include certain circuitry, described in more detail below, useful in detecting a variety of conditions, including electrical conditions, and react to the conditions to during operations. For example, the circuitry may detect electric shorts, such as when the clamps 14 and 16 are directly touching each other, or high resistance conditions, such when the user is touching metal in the clamps 14 and 16. In the depicted embodiment, the electrostimulating system 10 provides visual indications of operations and certain conditions by using lights, such as light emitting diode (LED) lights 22.

In operation, the user may then power on the portable electrostimulating system 10 for example by using a momentary contact button 24, and one or more of the lights 22 may turn on, for example, by showing a color red. The system may then derive certain operating conditions and turn on or off the LEDs 22 based on the derived conditions. For example, if the portable electrostimulating system 10 detects a short (e.g., clamps 14 and 16t touching), or an electrical resistance that is above a desired threshold, then the system 10 may derive that the conditions are contraindicatory to safe operations, and turn on one or more of the LEDs 22, and may then not allow for electrical stimulation. The LEDs 22 may be pulsed or blinked into patterns indicative of the derived conditions, including low electrical power conditions. If certain conditions are met, as described in more detail below, then the when the user activates a button 26, the portable electrostimulating system 10 may provide electrical stimulation of the carcass 12.

The electrical stimulation, for example, may be provided through delivery of electrical current to clamp 14 or 16 in pulses. The electrical current may flow through the carcass 12, causing contraction and relaxation of tissue corresponding to each applied pulse. As mentioned above, such contractions and relaxations of the tissue may enable may enable a faster discharge of blood and increase meat tenderization, thus improving the flavor of the meat. After delivery of a train of pulses, the portable electrostimulating system 10 may then reverse polarity and delivery a second train of pulses. Likewise, after delivery of the second train of pulses, the polarity may be reversed again and a third train of pulses may be delivered. By reversing polarity, any resistance built up in the tissue may be more easily overcome, thus more efficiently contracting and relaxing the tissue.

Figure 2:
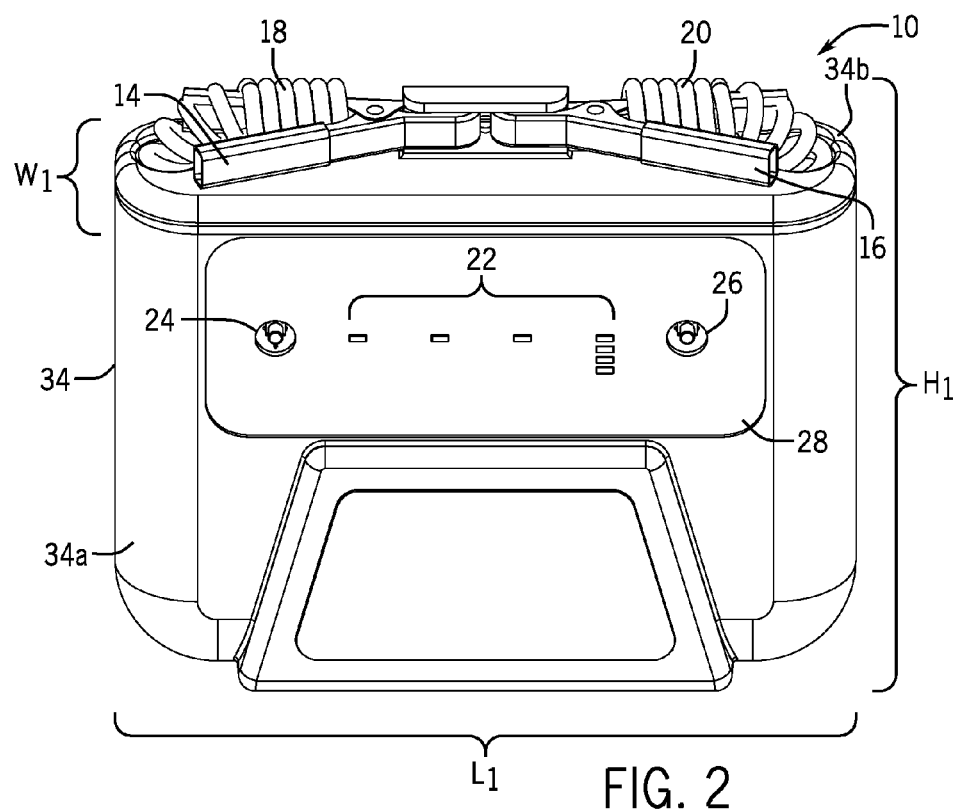
FIG. 2 depicts a perspective view of an embodiment of the portable electrical stimulation system illustrated in FIG. 1.

Turning now to FIG. 2, the figure is a perspective view of the portable electrostimulating system 10 showing further details of a front panel 28 and the clamps 14 and 16. As illustrated, the portable electrostimulating system 10 may be more easily carried into the field by virtue of its compact size and weight. For example, the portable electrostimulating system 10 may include a length L1 of between approximately 4 to 16 inches, a height H1 of between approximately 5 to 20 inches, and a width W1 of approximately between 1 and 8 inches. Likewise, a weight of the portable electro stimulator system 10 may be of approximately between 0.5 lbs and 10 lbs. By providing for a compact, portable electro stimulator system 10, the user, such as a hunter, may more easily transport the system 10 into the field and apply electrical stimulations suitable for tenderizing the game carcass 12.

The portable electrostimulating system 10 may include a housing 34, which may be provided in a variety of materials, including plastics, lightweight metals (e.g., aluminum, chromoly), carbon fiber, or a combination thereof. In one plastic manufacturing example, the housing 34 may be manufactured by using injection molding of two shells 34a and 34b, and the shells 34a and 34b may be fastened together, for example via screws, nuts and bolts, plastic fasteners, and so on, into the housing 34. The housing 34 may be provided in a variety of colors, such as green, red, or yellow for high visibility, or in color patters such as camouflage patterns useful for field hunting.

Also depicted are details of the indicator LEDs 22 disposed onto the panel 28. In one embodiment the LEDs 22 may be provided in three colors such as the colors red, green, and orange, or in LEDs 22 having multiple colors. During use, the colors may correspond to certain operating conditions. For example, the color green may be indicative of ongoing stimulation operations. The color orange may be indicative of an in-progress status, such as the charging of the portable electrostimulating system 10 prior to electrical stimulation. The color red may be indicative of shorted leads and/or high resistance conditions. Accordingly, the user may more easily glance at the panel 28 and see a visual indication of the status of the unit. Also disposed on the panel 28 are the buttons 24 and 26. Both of the buttons 24 and 26 may be momentary contact buttons covered in a protective film, which may be suitable for withstanding outdoor conditions. The button 24 may be used as an on/off button, while the button 26 may be used to deliver the corresponding electrical stimulation once the units' status is visualized as ready for use. It is to be noted, that, in other embodiments, the panel 28 may additionally or alternatively include other visual indicators such as an LED screen suitable for displaying text, images, and/or animation. For example, the LED screen may be visually displaying a message describing the current status of the unit such as, charging, ready for use, undesirable operation detected (e.g., shorts, high resistance), and so on. Likewise, audio indicators may also be provided, such as beeps, voice, and similar audio descriptive of operating status of the portable electrostimulating system 10. Power for running the portable electrostimulating system 10 may be provided, for example, by a rechargeable battery 37, as depicted in FIG. 3.

Figure 3:
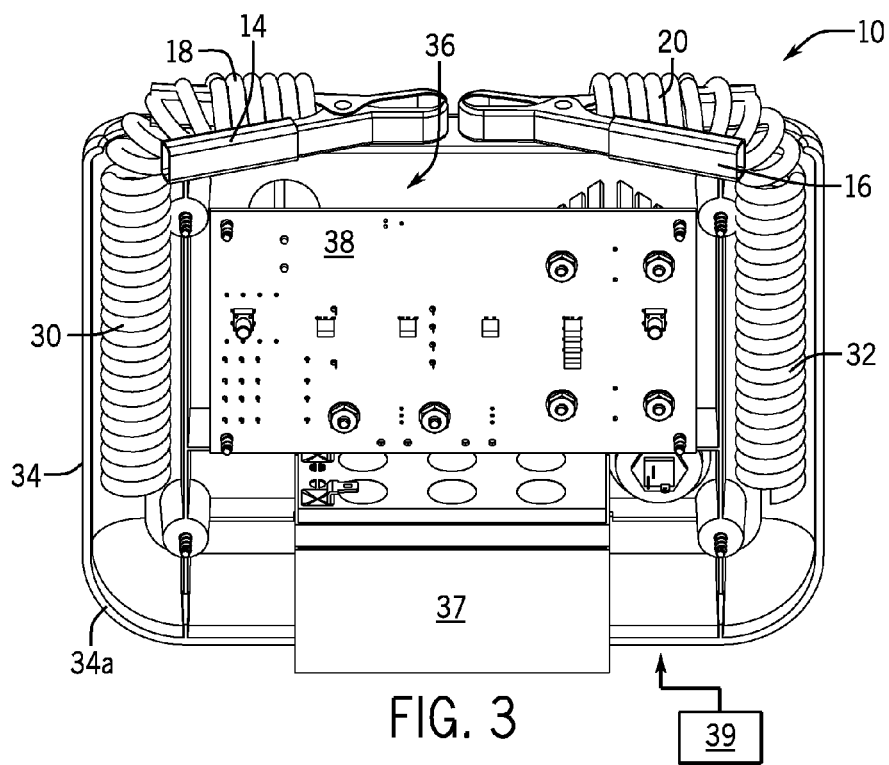
FIG. 3 depicts a perspective view of an embodiment of the portable electrical stimulation system illustrated in FIG. 1, with a front housing removed.

FIG. 3 depicts a perspective view of the portable electrostimulating system 10 having the rear shell 34b of the housing 34 removed to view details of a circuitry 36 and the rechargeable battery 37 enclosed within the housing 34. The rechargeable battery 37 may be a lead acid battery, a gel battery, or similar power source, suitable for delivering voltage between 6 to 24 volts. In the depicted embodiment, the battery 37 is a lead acid 12 volt rechargeable battery. The circuitry 36 may be a printed onto a board 38, such as a printed circuit board 38 attached to the shell 34b. In use, the battery 37 may provide electric power, and the circuitry 38 may then transform the electric power into suitable pulsed voltages that may be conducted through the conduits 18, 20 and delivered into the game animal carcass 12 via the clamps 14 and 16 as described above.

Figure 4:
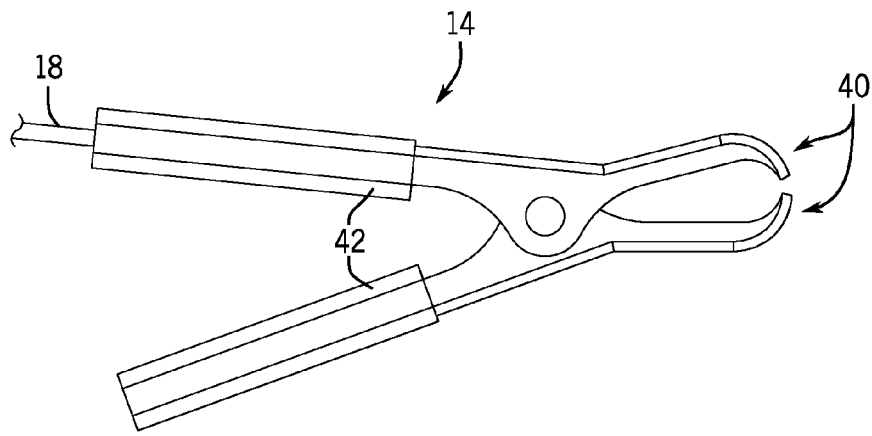
FIG. 4 is a top view depicting an embodiment of a clamp useful for delivering electrical stimulation to a carcass.

Also depicted is an external power source 39 that may be electrically coupled to the rechargeable battery 37. The external power source 39 may be a powered transformer attached to a wall outlet (e.g., 110 volt AC outlet), or a 12 volt adapter attached to a car battery, for example, by using a 12 volt port included in a car dash. In other embodiments, one or more solar panels may be provided for use as the external power source 39, which may then charge the battery 37 through solar power in the field. Once the battery 37 reaches a desired voltage charge, the circuitry 36 may then deliver electric current pulse trains through the clamps 14 and/or 16. The clamps 14 and 16 may be clamps having certain features suitable for enhancing operations, such as rounded edges or blunt ends (e.g., round or square ends), as depicted in FIG. 4. For example, as depicted in FIG. 4, the clamp 14 may include a proximal grip head 40 having rounded edges. By providing for the rounded edges, the grip head 40 may minimize or eliminate inadvertent punctures such as when using electro probes with needle points instead of the clamps 14 and 16. The spring clamps 14 and 16 may include a spring (not shown) biasing the rounded edges normally closed. In other embodiments, the spring may bias the rounded edges normally open, and a mechanical lock may be operated to close the edges in place. In the depicted embodiment, the clamp 14 includes two handles 42 suitable for opening the spring clamp 14 by using a single hand. For example, the user may grasp the handles 42 and then compress the handles 42 inwardly towards each other, thus opening the distal head 40. The spring clamp may then be inserted into, for example an incision cut into the animal carcass 12, and the handles 42 may then be released. Upon release, the spring bias may close the distal ends 40 thus providing for a mechanical engagement of the spring clamp 14 and a secure attachment of the spring clamp 14 onto the animal carcass 12. Once the spring clamps 14 and 16 are securely coupled onto the game animal carcass 12, the power supply 36 may deliver electro stimulation through the circuitry 36, as described below in more detail below with respect to FIG. 5.

Figure 5:
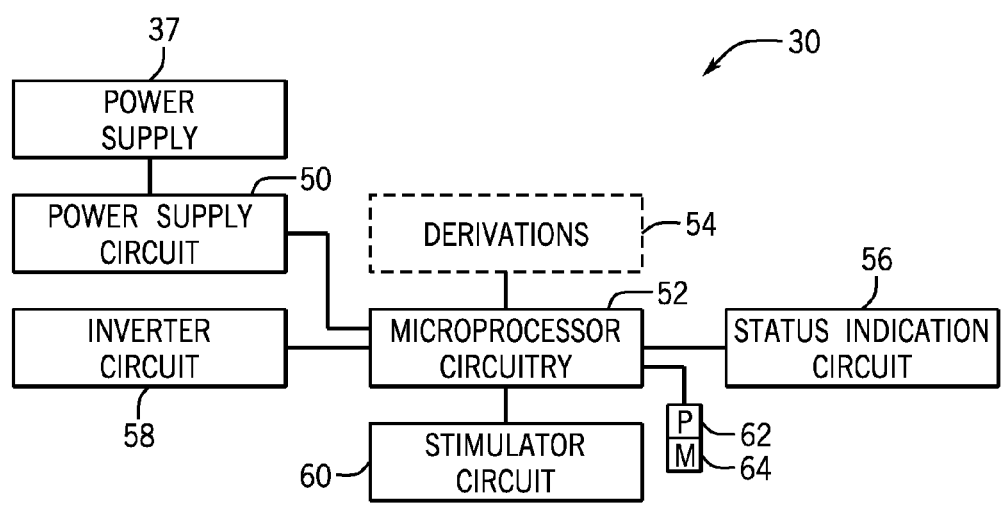
FIG. 5 is a block diagram of an embodiment of a circuitry suitable for providing electrical stimulation of a carcass.

FIG. 5 is a block diagram of an embodiment of the circuitry 36 powered by the battery 37 and suitable for providing electrical stimulation into the animal carcass 12. As illustrated, the circuitry 36 may be further subdivided into sub circuitry 50, 52, 54, 56, 58, and 60. In the embodiment shown, the power supply circuitry 50 includes electronic components suitable for converting power delivered via the battery 37 into electrical power useful in powering the microprocessor circuitry 52, such as 5 volt DC power or any other suitable power. Thus powered, microprocessor circuitry 52 may then verify derive certain conditions 54 (e.g., suitable power provided by the battery 37, shorts, high resistance, and so on), and use a status indication circuit 56 to visually display the conditions and status of the portable electrostimulating system 10. The status indication circuit 56 includes the LEDs 22 and may use the LEDs 22 to provide for blinking patterns and/or colors indicative of each of the conditions and derivations 54. The microprocessor circuitry 52 may include an integrated circuit (IC) chip, and in an exemplary example, the IC chip is an ATtiny48 chip available from Atmel Corporation, of San Jose, Calif. A variety of microprocessor chips and/or microcontrollers may be used, such as Arduino based chips, Basic Stamp microcontrollers, and the like.

The microprocessor circuitry 52 may include a processor 62 and memory 64. In the depicted embodiment, the memory 64 is shown included in the microprocessor 64, but may also be included in a separate IC and/or storage device (e.g., secure digital card). The processor 62 may be suitable for executing instructions stored in a non-transitory computer readable medium, such as the memory 64, the instructions configured to provide for several electrical stimulation processes as described in more detail below. The microprocessor circuitry 52 may also be communicatively coupled to the inverter circuit 58, suitable for providing higher voltages, for example, through the use of one or more capacitors.

The microprocessor circuitry 52 may also be communicatively coupled to the stimulator circuit 60, suitable for delivering trains of electrical pulses, such as a pulse train having between 5-50 pulses. After a certain number of pulse trains, the electrical polarity may be switched, and one or more pulse train may then be provided by the stimulator circuit 60. Switching the polarity may overcome tissue resistance built during the previous one or more pulse trains, and may increase meat tenderization and improve taste. It is to be noted that the circuitry 36 depicted in FIG. 5 may be provided in a variety of implementations, including a combination of analog and digital circuitry implementations. One exemplary implementation is described in more detail below with respect to FIG. 6.

Figure 6:
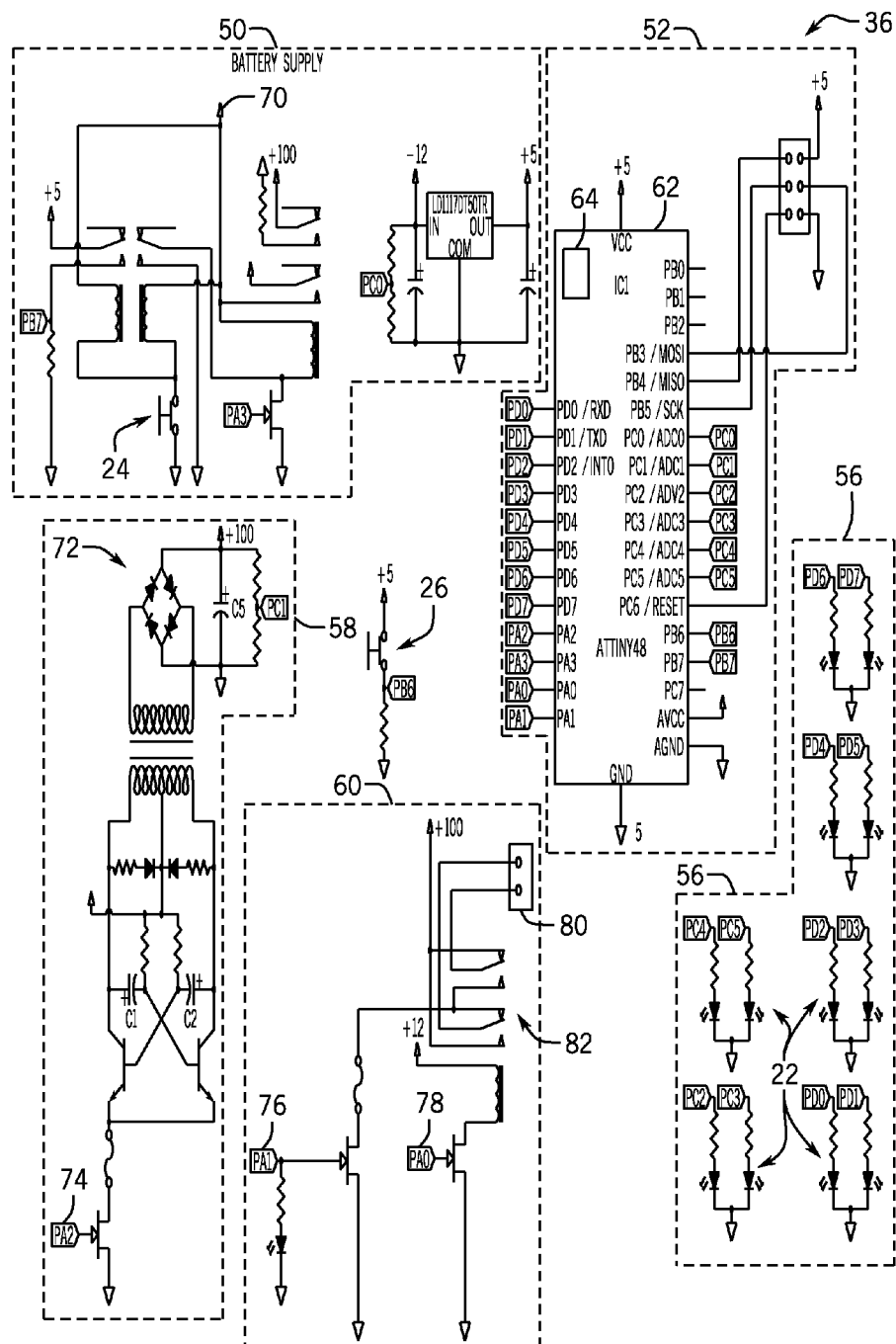
FIG. 6 is a schematic diagram depicting various embodiments of components of the circuitry of FIG. 5.

FIG. 6 is a schematic diagram of an exemplary embodiment of the circuitry 36 showing further details of components of the circuits 50, 52, 54, 56, 58, and 60. In use, the battery 37 may deliver 6 volts, 12 volts, or other voltage for example through terminal 70 included in the power supply circuit 50, which may then be stepped down and provided, for example as a 5 volt supply useful in powering the microprocessor 62. When powered, the microprocessor 62 may derive operating conditions and indications 54, as mentioned before, and use the status indication circuit 56 to turn off or on the LEDs 22. Certain of the derivations 54 may result in the microprocessor 62 shutting down operations. For example, low voltage for the battery 37, shorts across leads 80, high resistance across the leads 80, improper charging (e.g., insufficient voltage) for the capacitor C5, and so on, may result in the microprocessor 62 turning on certain colors and/or patterns in the LEDs 22 to indicate the undesired condition, and subsequently shutting off.

When ready to provide electrical stimulation, the microprocessor 62 may signal the inverter circuit 58 via terminal 74 to ramp up one or more capacitors, such as the capacitor C5, to a desired voltage. The desired voltage may be of between 10 to 150 volts. Once the microprocessor 62 derives that the conditions 54 are suitable for electrical stimulation, one or more of the LEDs 22 may be turned on to indicate that the portable electrostimulating system 10 is now ready for electrical stimulation. The user may then press, for example, the button 26, and the microprocessor 62 may begin providing electrical stimulation through the stimulator circuit 60. For example, terminals 76 and 78 labeled PA1 and PA0 respectively, may be used by the microprocessor 62 to signal the stimulator circuit 60 to deliver the aforementioned pulsed train of voltages such as a train of pulses having between 5 and 50 pulses over a desired time period such as a period of between 5 and 10 seconds, 5 and 30 seconds, 5 seconds and 1 minute, 5 seconds and 2 minutes. The electrical current incoming from the capacitor C5 may then flow through terminals 80, which may be communicatively coupled to the clamps 14 and 16. When coupled to the carcass 12, the clamps 14 and 16 may thus electrical stimulate tissue.

As depicted, relays 82 may be used to switch between positive and negative polarities during the stimulation activities. The microprocessor 62 may wait a desired time and/or number of pulses, and then switch polarity. Polarity may be switched between positive and negative, until a desired number of cycles of positive and negative current have been delivered and/or a certain time period has elapsed. The user may also press on a button, such as the button 24, and stop electrical stimulation. By providing for improved reliability and operations, the techniques described herein may result in a more reliable, and easy to operate portable electrostimulating system 10.

Figure 7:
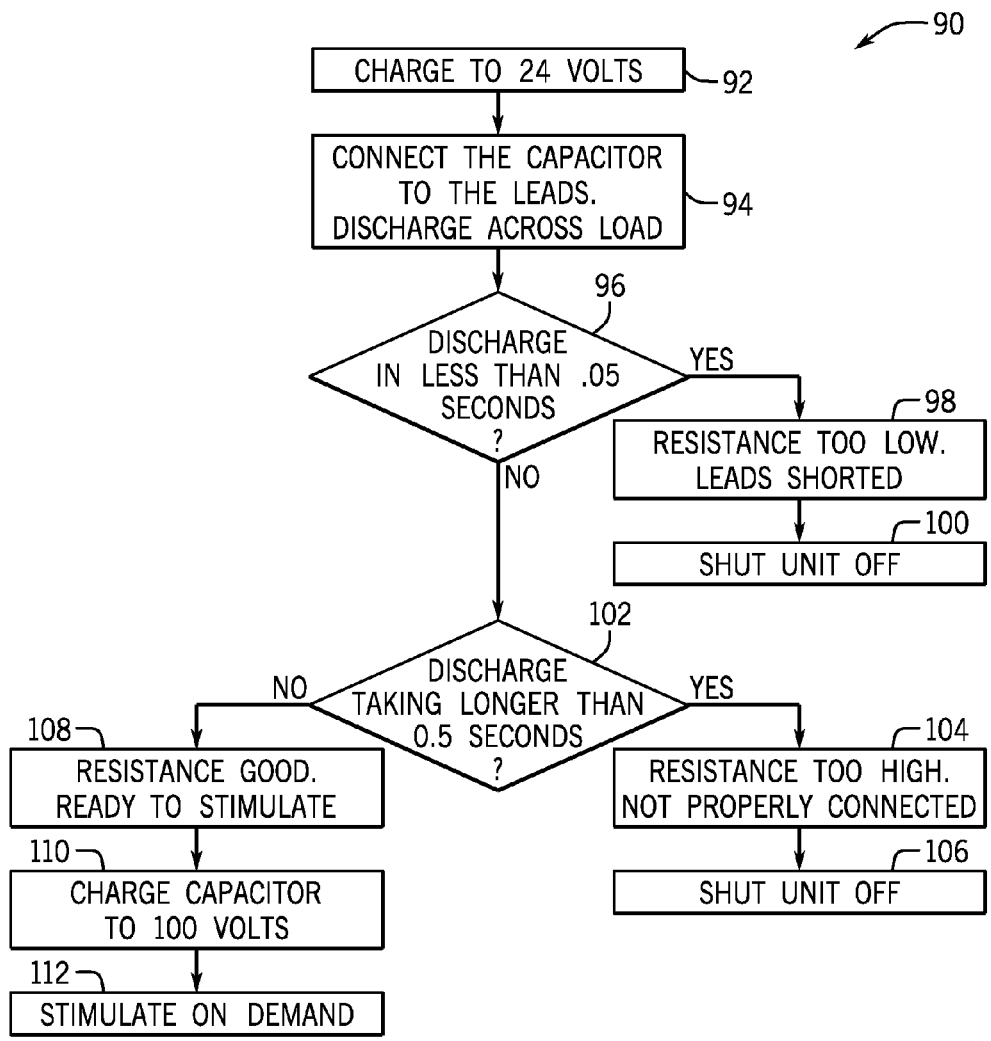
FIG. 7 is a flowchart of an embodiment of a process suitable for providing for the electrical stimulation of a carcass.

Turning now to FIG. 7, the figure is a flow chart of an embodiment of a process 90 suitable for providing enhanced operations during electrical stimulation of the animal carcass 12. The process 90 may be implemented as machine executable instructions stored in a non-transitory computer readable medium, such as the memory 64 associated with the microprocessor 62. The process 90 may first charge certain of the capacitors, such as the capacitor C5, of the inverter circuitry 58 to a desired voltage, such as 24 volts (block 92). The process 90 may then connect the charge capacitor or capacitors to leads (e.g., leads 80) and discharge across a load (block 94). If the discharge takes less than a desired time, for example, less than 0.05 seconds (decision 96), the process 90 may determine that resistance is too low (block 98). The resistance may be too low, for example, if the leads delivering the discharge across the load have been shorted (e.g., clamps 14 and 16 are touching). Accordingly, the process 90 may turn off the portable electrostimulating system 10 (block 100).

If the process 90 determines that discharge took less than the desired time (decision 96), then the process 90 may determine if the discharge is taking longer than a desired time, such as longer than 0.5 seconds (decision 102). If it is determined that discharge is taking longer than a desired time (decision 102), then the process 90 may derive that a resistance is unsuitably high (block 104). For example, the resistance may be undesirably high (block 104) because there may be an improper connection between leads 80. Accordingly, the process 90 may turn off the portable electrostimulating system 10 (block 106). If the process 90 determines that discharge is not taking longer than a desired time (decision 102), then the process 90 may derive that there is a suitable resistance and that stimulation is safer (block 108). Accordingly, certain capacitors, e.g., C5 shown in FIG. 6, may be charged for example to 100 volts or more (block 110). The process 90 may then provide for on-demand electrical stimulation of the carcass 12 (block 112). By enabling a derivation of certain conditions (e.g., blocks 98 and 104), the process 90 may electrically stimulate (block 112) when it is determined that operations may be provided with enhanced operations. It is to be noted that the times, e.g., 0.05 seconds and 0.5 seconds, depicted in FIG. 7 are examples only, and during implementation may be changed to values between plus or minus 100%, between plus or minus 200%, between plus or minus 500% of the depicted values. Likewise, the voltage of 24 volts depicted in block 92 may be, in certain embodiments, between 10 to 150 volts.

Figure 8:
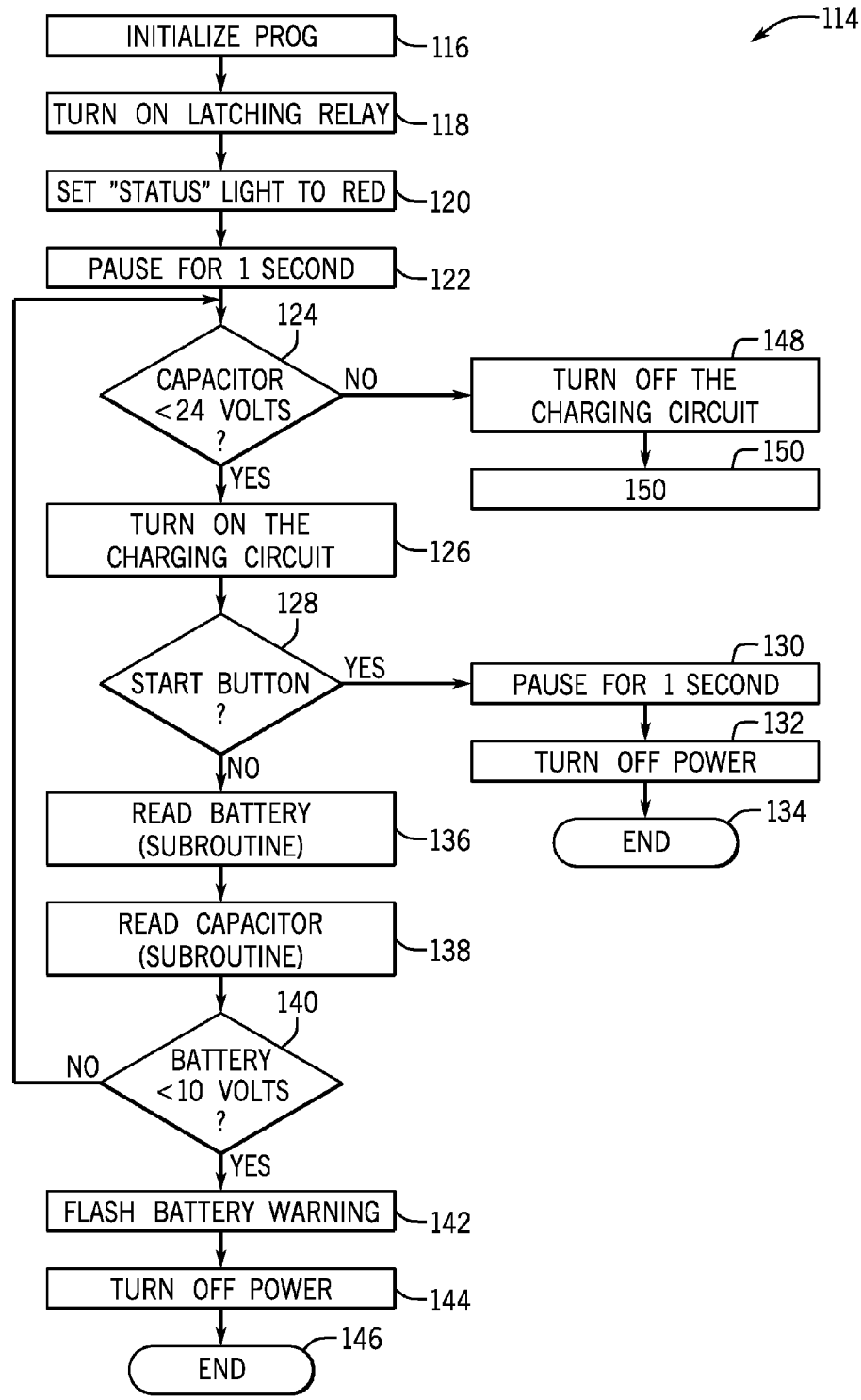
FIG. 8 is a flowchart of an embodiment of a process suitable for providing for a start-up sequence for the portable electrical stimulation system of FIG. 1.

FIGS. 8-11 are flowcharts of various embodiments of processes that the portable electrostimulating system 10 may execute to electrically stimulate the animal carcass 12. Each of the depicted processes may be implemented as executable computer instructions stored in the non-transitory memory 64 suitable for execution by the processor 62. Turning now to FIG. 8, the figure is a flowchart of an embodiment of a process 114 suitable for providing a startup sequence for the portable electrostimulating system 10. In the depicted embodiment, the process 114 may first initialize (block 116) various program variables and environment. For example, the process 114 may define certain macros, set ports, and so on to initialize a program environment (block 116). The process 114 may then turn on a latching relay (block 118). The latching relay may be useful for example in providing power through the battery or power supply 37. The process 114 may then set a visual status light 22 to a desired color, such as the color red indicative of a power on status (block 120). The process 114 may then pause for a desired time (block 122), for example, for 1 second. The process 114 may then derive a voltage of certain capacitor or capacitors useful in delivering stimulation voltage, such as the capacitor labeled C5 in FIG. 6 above. If it is determined that the capacitor or capacitors are less than a desired voltage (e.g., 24 volts) (decision 124), then the process 114 may turn on a charging circuit such as the inverter circuit or portions of the inverter circuit 58 (block 126).

If the process 114 determines (decision 128) that the start button 24 has been activated, (decision 128) then the process 114 may pause for 1 second or other desired time interval (block 130) and power to the circuitry 36 may then be turned off (block 132). The process 114 may then terminate execution at block 134. If the process 114 determines (decision 128) that the start button 24 was not activated, then the process 114 may read a battery voltage, such as the battery 37 voltage (block 136) and may also read a capacitor voltage, such as the capacitor C5 voltage (block 138). The process 114 may then determine (decision 140) if the battery 37 is at an undesired voltage, for example, at a voltage less than 10 volts when the desired voltage is over 10 volts. If it is determined that the battery 37 is at an undesired voltage, such as a voltage less than 10 volts (decision 140), the process 114 may flash the lights 22 with a certain pattern indicative of a low battery condition (block 142). The process 114 may then turn off power to the circuitry 36 (block 144), and may then terminate execution (block 146). However, if the process 114 determines (decision 124) that the capacitor, e.g., C5, is not at an undesired voltage, the process 114 may then turn off the charging circuit portions, such as portions of the inverter circuit 58 or the entire inverter circuit 58 (block 148). At block 148, the process 114 may have realized a voltage useful in electrically stimulating the carcass 12, and may then execute a check sequence process 150, described in more detail below with respect to FIG. 9.

Figure 9:
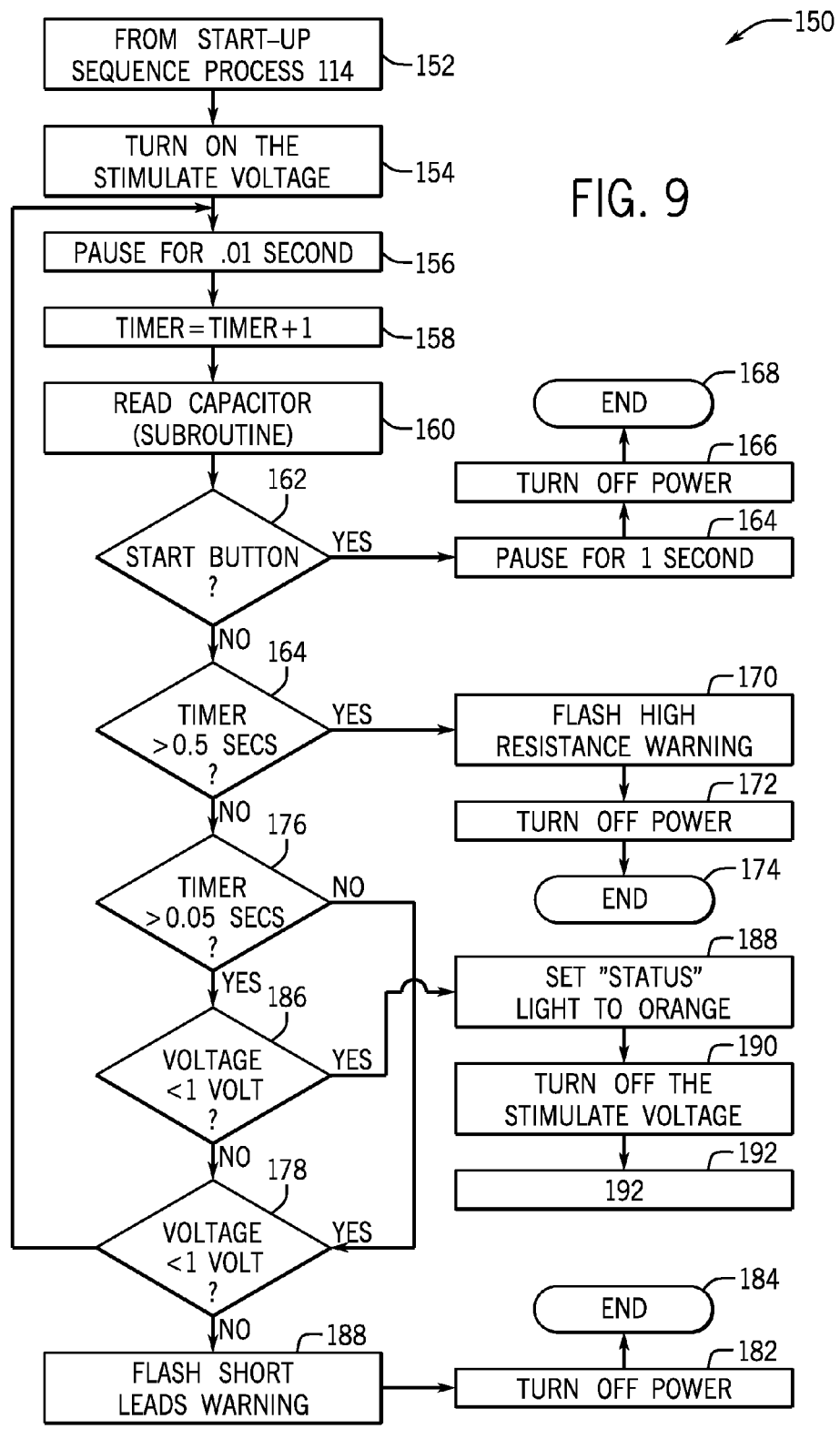
FIG. 9 is a flowchart of an embodiment of a process suitable for providing for a check sequence for the portable electrical stimulation system of FIG. 1.

FIG. 9 is an embodiment of a process 150 useful in providing for a check sequence during electrical stimulation activities. In the depicted embodiment, the process 150 may begin execution, as mentioned before with respect to FIG. 8, following execution of block 148 of the process 114 (block 152). The process 150 may then turn on a stimulation voltage (block 154). The process 150 may then pause for a desired time for example, 0.01 seconds (block 156). The process 150 may then increment a timer variable (block 158) and may then read, for example, the capacitor C5 voltage (block 160). If it is determined (decision 162) that the start button 24 was pressed, then the process 150 may pause for 1 second (block 164), for example, because the user wishes to terminate electrical stimulation activities. The process 150 may then turn off power to the circuitry 36 (block 166), and may subsequently terminate execution (block 168).

If it is determined that the start button 24 was not activated, the process 150 may then determine (decision 165) if the timer is greater than a desired time, for example, greater than 0.5 seconds. If it is determined (decision 165) that the timer is greater than a desired time, such as greater than 0.5 seconds, the process 150 may derive that unwanted resistance is present. Accordingly, the process 150 may utilize the lights 22 to flash a high resistance warning by using certain light patterns (block 170), and the process 150 may then turn off power to the circuitry 36 (block 172) and subsequently terminate execution (block 174).

If the process 150 determines (decision 165) that the timer is not greater than the desired time (e.g., 0.5 seconds), the process 150 may then determine (decision 176) if the timer is greater than a second desired time, such as a time of 0.05 seconds. If the timer is not greater than the second desired time (e.g., 0.05 seconds) (decision 176), the process 150 may then determine if a voltage, such as the stimulation voltage, is less than a desired voltage, such as 1 volt (decision 178). If the voltage, e.g., stimulation voltage, is not less than 1 volt (decision 178), the process 150 may continue execution at block 156. If it is determined (decision 178) that the voltage of the capacitor, e.g., capacitor C5, is less than a desired voltage, e.g., 1 volt, then the process 150 may derive that there is a short, for example, in between the clamps 14 and 16 and/or the terminals 80. Accordingly, the process 150 may then utilize the lights 22 to flash a set of patterns corresponding to shorted leads warning (block 180). The process 150 may then turn off power of the circuitry 36 (block 182) and subsequently terminate execution (block 184).

If the process 150 determines (decision 186) that the voltage, e.g., stimulation voltage, is less than 1 volt, the process 150 may set the lights 22 to a color, such as a color orange (block 188), to denote that checks are complete and that electrical charging is now starting, and then turn off the stimulate voltage (block 190). At block 190 the process 150 may have reached a state suitable for charging to a voltage useful in electrical stimulation, and may then proceed onto a process 192 as described in more detail with respect to FIG. 10 below.

Figure 10:
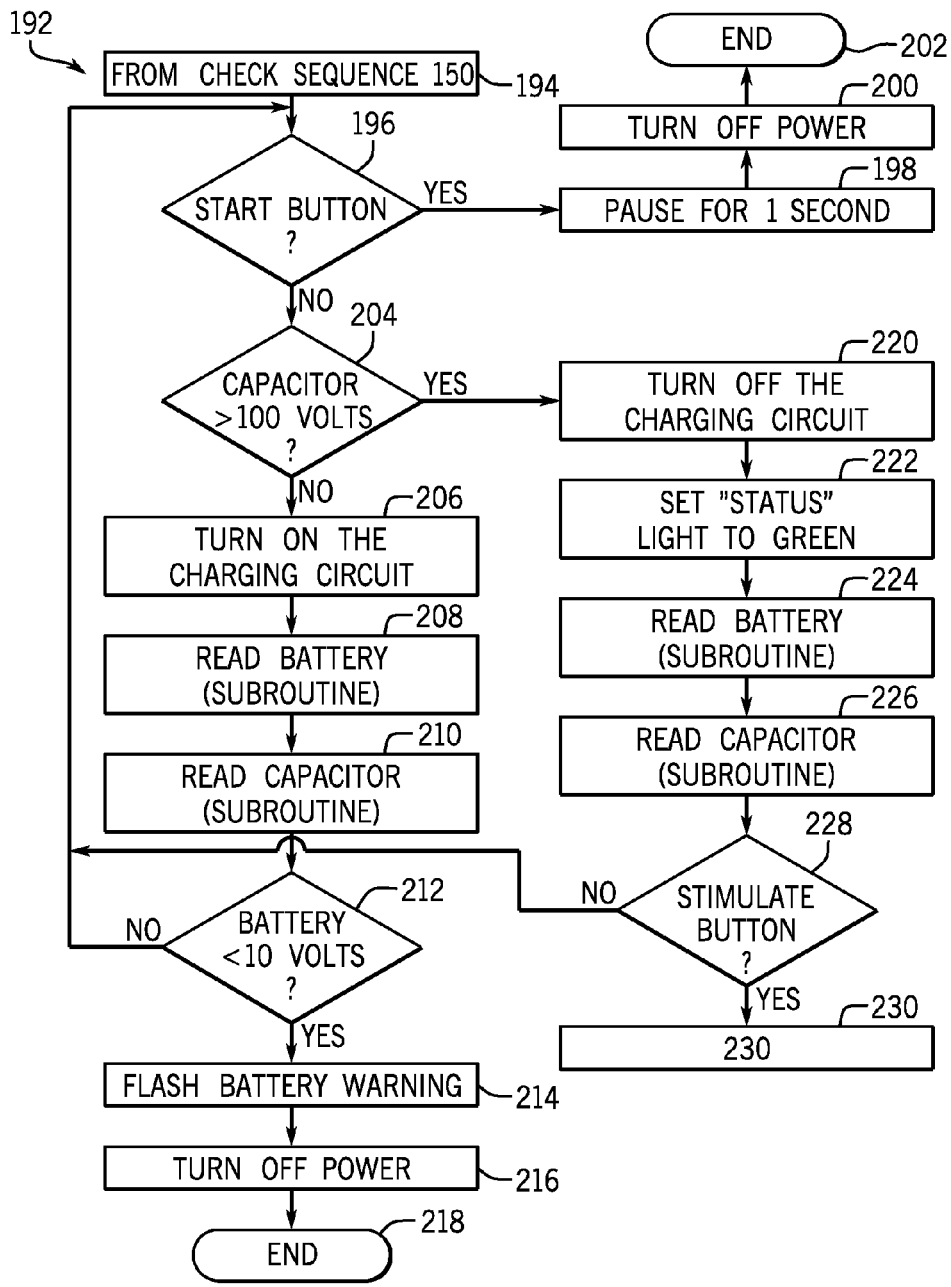
FIG. 10 is a flowchart of an embodiment of a process suitable for providing for a waiting to stimulate sequence for the portable electrical stimulation system of FIG. 1.

FIG. 10 is a flowchart of an embodiment of a process 192 suitable for execution by the microprocessor 62 when waiting for the user to electrically stimulate the animal carcass 12. As illustrated, the process 192 may begin execution, as mentioned before with respect to FIG. 9, following execution of block 190 of the process 150 (block 194). The process 192 may determine (decision 196) if the start button 24 was activated. If the start button 24 was activated, then the user may wish to stop electro stimulation activities and the process 192 may first pause for a desired time, such as 1 second (block 198), and then turn off power (block 200). The process 192 may then subsequently stop execution (block 202). If the start button 24 was not activated (decision 196), the process 192 may then determine (decision 204) if the capacitor, e.g., capacitor C5, has a voltage exceeding a desired voltage, such as 100 volts. If the capacitor does not have the voltage exceeding a desired voltage (decision 204), then the process 192 may turn on the charging circuit (block 206), read the battery 37 voltage (block 208), and then read the capacitor C5 voltage (block 210).

The process 192 may then determine (decision 212) if the battery 37 voltage is less than a desired amount, such as 10 volts. If the battery voltage is less than a desired amount (decision 212), then the battery may have insufficient voltage for stimulation. Accordingly, the process 192 may flash a set of patterns indicative of low battery (block 214) and then turn off power (block 216) to the circuitry 36. The process 192 may subsequently terminate execution (block 218). If the process 192 determines (decision 212) that the battery voltage is equal to or exceeds a desired voltage, the process 192 may continue execution at decision 196.

If the process 192 determines (decision 204) that the capacitor voltage exceeds a desired voltage amount, the process 192 may then turn off the charging circuit (block 220). The process 192 may then set the visual indication lights 22 to a color such as green to denote that the portable electrostimulating system 10 is now charged and ready to provide electrical stimulation (block 222). The process 192 may then read the battery 37 voltage (block 224) and additionally read the capacitor C5 voltage (block 226). The process 192 may then determine (decision 228) if the stimulate button 26 was activated. If the stimulate button 26 was not activated (decision 228) the process 192 may continue execution at decision 196. If the process 192 determines (decision 228) that the stimulate button 26 was activated, the process 192 may then execute a process 230 suitable for delivering electrical stimulation, described in more detail below with respect to FIG. 11.

Figure 11:
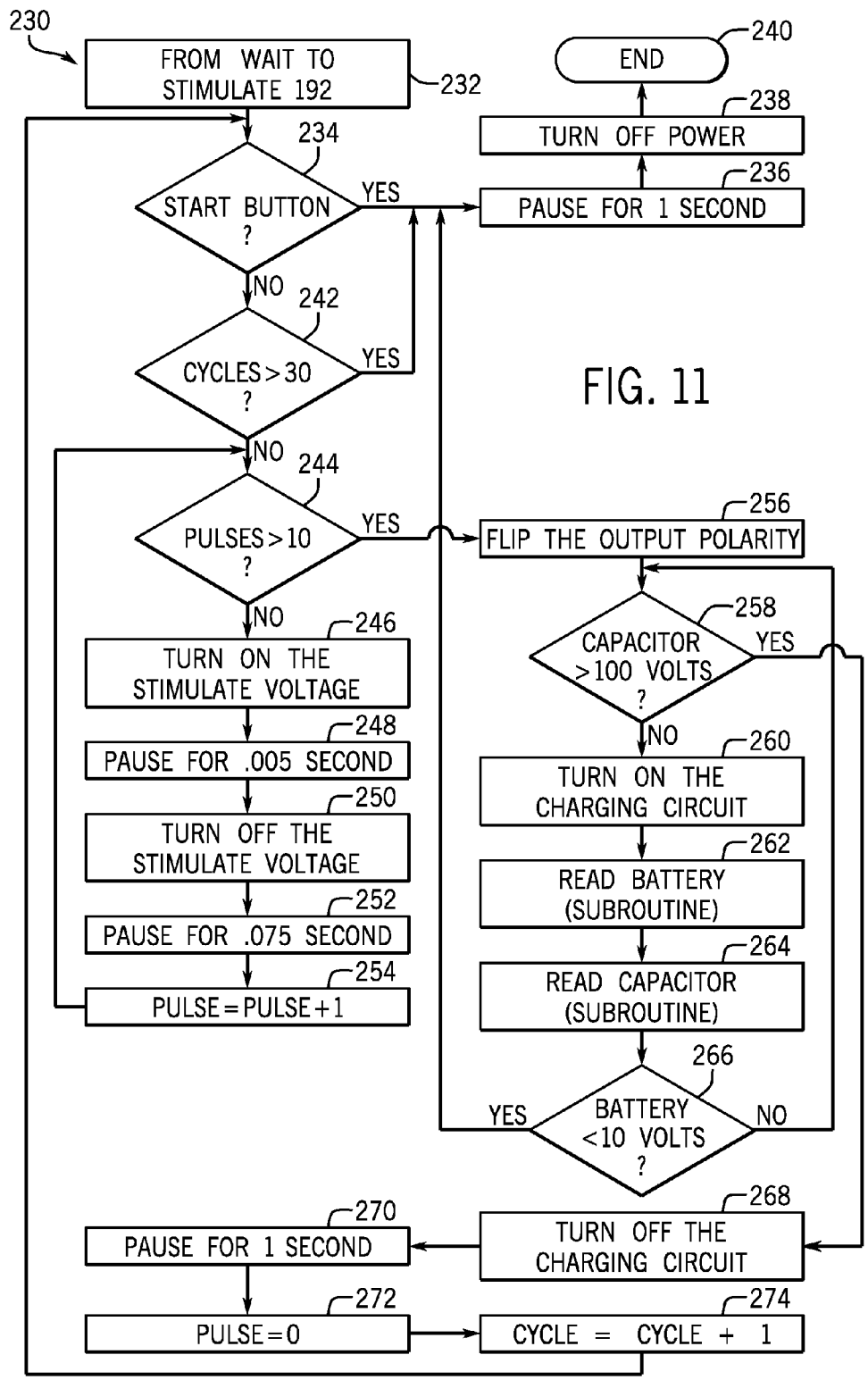
FIG. 11 is a flowchart of an embodiment of a process suitable for electrically stimulating a carcass for the portable electrical stimulation system of FIG. 1.

FIG. 11 is a flow chart of an embodiment of a process 230 suitable for delivering electrical stimulation into the animal carcass 12. In the depicted embodiment, the process 230 may begin execution, as mentioned before with respect to FIG. 10, following execution of decision 228 of the process 192 (block 232). The process 230 may determine if the start button 24 was activated (decision 234). If the start button 24 was activated (decision 234), then the user may desire to stop electrical stimulation activities. Accordingly, the process 230 may pause for a desired time, such as 1 second, (block 236), and turn off power to the circuitry 36 (block 238). The process 230 may subsequently terminate execution (block 240). If the process 230 determines (decision 234) that the start button 24 was not activated, the process 230 may then determine (decision 242) if a cycle count has exceeded a desired number, such as 30. By monitoring the cycle count, the process 230 may deliver a set of pulses as part of a cycle and then stop electrical stimulation activity. For example 10 pulses may first be delivered, followed by a reversing of the polarity and the delivery of 10 additional pulses, all of these constituting one cycle and at 30 cycles power may then be stopped. If the process 230 determines that the cycle count has exceeded a desired number (decision 242) the process 230 may also pause for 1 second (block 236), turn off power (block 238), and terminate execution (block 240).

If the process 230 determines that the cycle count has not exceeded a desired cycle number (decision 242) the process 230 may then determine (decision 244) if a number of pulses has not exceeded a desired pulse count. If the number of pulses delivered into the animal carcass 12 has note exceeded a desired pulse count (decision 244), then the process 230 may turn on stimulation voltage (block 246) to deliver a desired voltage, for example a voltage of between 18 and 25 volts as a pulse, and may then pause for a desired time, such as 0.005 seconds (block 248). If the process 230 determines that the pulse count has exceeded a desired number (decision 244), the process 230 may then reverse the output polarity of the electrical stimulation (block 256). The process 230 may then determine (decision 258) if the capacitor, e.g., capacitor C5, includes a voltage exceeding a desired amount, such as 100 volts. If the capacitor does not exceed the desired voltage amount (decision 258) the process 230 may then turn on the charging circuit (block 260).

The process 230 may then read the battery 37 voltage (block 262) and read the capacitor C5 voltage (block 264). The process 230 may then determine (decision 266) if the power supply 36 voltage is below a desired amount, such as 10 volts. If it is determined (decision 266) that the power supply voltage is below a desired amount, the process 230 may continue execution at block 236. If it is determined (decision 266) that the power supply 36 voltage is not under a desired amount, the process 230 may continue execution at decision 258. If the process 230 determines (decision 258) that the capacitor exceeds a desired amount, the process 230 may then turn off the charging circuit (block 268) pause for a desired amount, such as 1 second (block 270), set the pulse count to zero (block 272), and increment the cycle count by 1 (block 274). It is to be noted that the all the times, e.g., 0.05 seconds and 0.5 seconds, depicted in FIGS. 8-11 are examples only, and during implementation may be changed to time values between plus or minus 100%, between plus or minus 200%, between plus or minus 500% of the depicted values. Likewise, all the voltage values depicted in FIGS. 8-11 may be, in certain embodiments, between 10 to 150 volts. The process may then continue at decision 234. By providing for the processes 90, 114, 150, 192, 230, the techniques described herein may more efficiently tenderize meat, such as the tissue of the game carcass 12.

Technical effects of the invention include a portable electrostimulating system suitable for field use with enhanced operating features. The portable electrostimulating system may detect conditions such as shorts and high resistance, and stop electrical stimulation activities if such conditions are detected. The portable electrostimulating system may include clamps suitable for more easily attaching to a carcass while minimizing or eliminating inadvertent punctures of the carcass or of the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A portable system for electrically stimulating meat comprising:
   a portable housing configured to house a battery power supply;
   a first end connector configured to attach to a target of tenderization;
   a second end connector configured to attach to the target of tenderization; and
   circuitry electrically coupling the battery power supply to the first or the second end connectors, the circuitry disposed in the portable housing, wherein the circuitry comprises a microprocessor programmed to derive a first electrical condition and to electrically stimulate the target by delivering a current at an amperage sufficient to cause a tenderization of meat through the first and the second end connectors only when the first electrical condition is not met.

2. The system of claim 1, wherein the first electrical condition comprises a short between the first end connector and the second end connector.

3. The system of claim 2, wherein the microprocessor is programmed to derive a second electrical condition and to electrically stimulate the target only when the first and the second electrical conditions are not met.

4. The system of claim 3, wherein the second electrical condition comprises a high resistance between the first end connector and the second end connector.

5. The system of claim 1, first end connector or the second end connector comprises a clamp.

6. The system of claim 5, wherein the clamp comprises a spring bias clamp.

7. The system of claim 6, wherein the spring bias clamp comprises a rounded edge biased normally closed.

8. The system of claim 1, comprising a first and a second switch communicatively coupled to the circuitry, wherein the first button is configured to turn on the circuitry, turn off the circuitry, or a combination thereof, and wherein the second button is configured to transmit a first signal to the microprocessor to indicate start of electrical stimulation, and wherein the first button is configured to transmit a second signal to the microprocessor to indicate stop of the electrical stimulation, the second signal overriding the first signal.

9. The system of claim 1, wherein the microprocessor is programmed to electrically stimulate by delivering a first plurality of electrical pulses having a first polarity.

10. The system of claim 1, comprising a first and a second switch communicatively coupled to the circuitry, wherein the first switch is configured to turn on the circuitry, turn off the circuitry, or a combination thereof, wherein the second switch is configured to transmit a first signal to the microprocessor to indicate start of electrical stimulation, and wherein the first switch is configured to transmit a second signal to the microprocessor to indicate stop of the electrical stimulation, the second signal overriding the first signal, wherein the first electrical condition comprises a short between the first end connector and the second end connector, wherein the first end connector or the second end connector comprises a clamp, and wherein the microprocessor is programmed to electrically stimulate by delivering a first plurality of electrical pulses having a first polarity.

* * * * *